(12) United States Patent
Aelion et al.

(10) Patent No.: US 9,773,344 B2
(45) Date of Patent: Sep. 26, 2017

(54) GRAPHICS PROCESSOR CLOCK SCALING BASED ON IDLE TIME

(71) Applicant: NVIDIA Corporation, Santa Clara, CA (US)

(72) Inventors: Ilan Aelion, Fort Collins, CO (US); Terje Bergstrom, Espoo (FI); Matthew R. Longnecker, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 751 days.

(21) Appl. No.: 13/712,839

(22) Filed: Dec. 12, 2012

(65) Prior Publication Data

US 2013/0179711 A1    Jul. 11, 2013

Related U.S. Application Data

(60) Provisional application No. 61/585,620, filed on Jan. 11, 2012.

(51) Int. Cl.
| | | |
|---|---|---|
| G06F 1/32 | (2006.01) | |
| G06F 11/30 | (2006.01) | |
| G06T 15/80 | (2011.01) | |
| G06F 11/34 | (2006.01) | |

(52) U.S. Cl.
CPC ............. *G06T 15/80* (2013.01); *G06F 1/324* (2013.01); *G06F 1/3218* (2013.01); *G06F 1/3265* (2013.01); *G06F 11/3423* (2013.01); *Y02B 60/1217* (2013.01)

(58) Field of Classification Search
CPC ...... G06F 1/3218; G06F 1/324; G06F 1/3265; G06F 11/3423
USPC ................................. 713/300, 320, 322, 323
See application file for complete search history.

(56) References Cited

U.S. PATENT DOCUMENTS

| | | |
|---|---|---|
| 5,142,690 A | 8/1992 | McMullan, Jr. et al. |
| 5,386,552 A | 1/1995 | Garney |
| 5,388,265 A | 2/1995 | Volk |
| 5,396,635 A | 3/1995 | Fung |
| 5,402,492 A | 3/1995 | Goodman et al. |
| 5,446,904 A | 8/1995 | Belt et al. |
| 5,524,249 A | 6/1996 | Suboh |
| 5,557,777 A | 9/1996 | Culbert |
| 5,752,050 A | 5/1998 | Hernandez et al. |
| 5,790,877 A | 8/1998 | Nishiyama et al. |
| 5,889,529 A | 3/1999 | Jones et al. |
| 5,898,879 A | 4/1999 | Kim |
| 5,951,689 A | 9/1999 | Evoy et al. |
| 6,178,523 B1 | 1/2001 | Klein |

(Continued)

FOREIGN PATENT DOCUMENTS

| | | |
|---|---|---|
| GB | 2547170 | 8/2009 |
| WO | 20040102623 | 11/2004 |

OTHER PUBLICATIONS

IEEE Journal of Solid-State Circuits, vol. 42, No. 1, Jan. 2007, pp. 1-10.

*Primary Examiner* — Michael J Brown (57) ABSTRACT

A method for graphics processor clock scaling comprises the following steps. A percentage of idle-time is calculated, based upon an elapsed idle-time and an elapsed active time. A graphics processor clock rate is reduced if the percentage of idle time is higher than a high limit threshold. The graphics processor clock rate is increased if the percentage of idle time is lower than a low limit threshold.

18 Claims, 5 Drawing Sheets

(56) References Cited

U.S. PATENT DOCUMENTS

| | | |
|---|---|---|
| 6,266,776 B1 | 7/2001 | Sakai |
| 6,272,649 B1 | 8/2001 | Hayward et al. |
| 6,275,919 B1 | 8/2001 | Johnson |
| 6,347,370 B1 | 2/2002 | Grimsrud |
| 6,523,128 B1 | 2/2003 | Stapleton et al. |
| 6,542,240 B2 | 4/2003 | Lagace |
| 6,549,240 B1 | 4/2003 | Reitmeier |
| 6,694,451 B2 | 2/2004 | Atkinson |
| 6,760,850 B1 | 7/2004 | Atkinson et al. |
| 6,804,763 B1 | 10/2004 | Stockdale et al. |
| 6,845,434 B2 | 1/2005 | Lin |
| 6,901,298 B1 | 5/2005 | Govindaraj et al. |
| 6,990,594 B2 | 1/2006 | Kim |
| 7,015,909 B1 | 3/2006 | Morgan, III et al. |
| 7,043,649 B2 | 5/2006 | Terrell, II |
| 7,058,834 B2 | 6/2006 | Woods et al. |
| 7,100,013 B1 | 8/2006 | de Waal |
| 7,174,472 B2 | 2/2007 | Hill |
| 7,401,240 B2 | 7/2008 | Heller, Jr. et al. |
| 7,414,550 B1 | 8/2008 | Sudharsanan |
| 7,426,647 B2 | 9/2008 | Fleck et al. |
| 7,428,644 B2 | 9/2008 | Jeddeloh et al. |
| 7,434,072 B2 | 10/2008 | Peirson et al. |
| 7,529,958 B2 | 5/2009 | Roth et al. |
| 7,590,815 B1 | 9/2009 | de Waal |
| 7,624,215 B2 | 11/2009 | Axford et al. |
| 7,739,533 B2 | 6/2010 | Rauschmayer et al. |
| 7,839,410 B1 | 11/2010 | Brown et al. |
| 8,327,173 B2 | 12/2012 | Hendin et al. |
| 9,209,792 B1 | 12/2015 | Browning |
| 9,411,390 B2 | 8/2016 | Smith et al. |
| 9,423,846 B2 | 8/2016 | Smith et al. |
| 9,547,602 B2 | 1/2017 | Klaiber et al. |
| 2002/0126751 A1 | 9/2002 | Scheurich et al. |
| 2003/0004921 A1 | 1/2003 | Schroeder |
| 2003/0156639 A1 | 8/2003 | Liang |
| 2003/0204757 A1 | 10/2003 | Flynn |
| 2005/0021656 A1 | 1/2005 | Callegari |
| 2005/0057551 A1 | 3/2005 | Gong et al. |
| 2005/0271361 A1 | 12/2005 | Aoki et al. |
| 2006/184808 A1 | 8/2006 | Chua-Eoan et al. |
| 2006/0226895 A1 | 10/2006 | Hoshi et al. |
| 2007/0206018 A1* | 9/2007 | Bajic et al. .......... 345/501 |
| 2009/0204830 A1* | 8/2009 | Frid et al. .......... 713/322 |
| 2012/0054519 A1* | 3/2012 | Branover et al. ...... 713/322 |
| 2012/0105452 A1 | 5/2012 | Diard |
| 2012/0110351 A1* | 5/2012 | Raju ............. G06F 1/3203 713/300 |
| 2012/0188233 A1 | 7/2012 | Shuster et al. |
| 2012/0223940 A1 | 9/2012 | Dunstan et al. |
| 2012/0306877 A1 | 12/2012 | Rosasco |
| 2013/0002838 A1 | 1/2013 | Takenaka |
| 2013/0097443 A1* | 4/2013 | Li et al. .......... 713/322 |

\* cited by examiner

GRAPHICS PROCESSOR CLOCK SCALING BASED ON IDLE TIME

CROSS-REFERENCES TO RELATED APPLICATIONS

This application claims the benefit of Provisional Application No. 61/585,620, filed on Jan. 11, 2012, titled "GRAPHICS PROCESSOR CLOCK SCALING, APPLICATION LOAD TIME IMPROVEMENTS, AND DYNAMICALLY ADJUSTING RESOLUTION OF RENDER BUFFER TO IMPROVE AND STABILIZE FRAME TIMES OF A GRAPHICS PROCESSOR," by Swaminathan Narayanan, et al., which is herein incorporated by reference.

TECHNICAL FIELD

Embodiments of the present disclosure relate generally to the field of graphics processors and more specifically to the field of energy efficient graphics processors.

BACKGROUND

Computer systems continue to evolve, with ever faster processing speeds, greater data handling capabilities, and increasing storage capacity. Computers have also been steadily reduced in size. This size reduction is most apparent in the laptop, notebook, tablet and hand-held computer markets. While desiring to continuously decrease the size and weight of laptops, notebooks, and hand-held computers, manufacturers have also steadily reduced the size and weight of on-board batteries. Because battery-life in laptops, notebooks, and hand-held computers is such a strong consideration, power management methods are utilized to increase battery-life.

In conventional computer systems, a graphics processing unit (GPU), following instructions from a central processing unit (CPU), processes frames of display data that are subsequently sent to a display device. In one exemplary embodiment, the graphics processor, via an interface, supplies a next frame of display information to a timing controller of a display panel. In one embodiment, the display panel is refreshing at a 60 Hz rate. Therefore, approximately every 16.7 milliseconds a new frame of display information needs to be processed by the graphics processor and delivered to the display panel. Because a graphics processor may process a frame of display data faster than the exemplary 16.7 milliseconds between refreshes, the graphics processor may experience periods of idle time, where no display data remains to be processed, while the graphics processor continues running at its current clock rate.

SUMMARY OF THE INVENTION

Embodiments of this present invention provide solutions to the challenges inherent in improving graphics processor power efficiency within a computer system. In a method according to one embodiment of the present invention, a method for dynamic graphics processor clock scaling based on a percentage of idle time is disclosed. In one embodiment, a percentage of idle time is calculated based upon an elapsed idle time and an elapsed active time. The graphics processor unit (GPU) clock rate is reduced if the idle time percentage is higher than a high limit threshold. The GPU clock rate is increased if the idle time percentage is below a low limit threshold.

In another method according to one embodiment of the present invention, a method for dynamically adjusting a criterion for a procedure for dynamically scaling a clock for a graphics processor is disclosed. An initial value is selected for a low idle time limit and a high idle time limit. A quantity of scale up and scale down decisions are counted over a period of several evaluation periods. The clock scale-up decisions and the clock scale-down decisions increase and decrease a graphics processor clock rate, respectively, when a percentage of idle time in an evaluation period is lower than the idle-time percentage low-limit value or higher than the idle-time percentage high-limit value, respectively. A proportion of scale up to scale down decisions is calculated. If an up/down ratio is at a high limit, the idle time percentage limits are increased. If the up/down ratio is at a low limit, the idle time percentage limits are decreased.

In a computer system according to one embodiment of the present invention, the computer system comprises a processor, a graphics processor, a memory, and a clock generator. The clock generator is operable to generate clock signals for the processor and the graphics processor. The memory is operable to store instructions, that when executed by the processor perform a method of dynamically scaling a clock output of the clock generator to the graphics processor. The method comprises calculating a percentage of idle-time based upon an elapsed idle-time and an elapsed active time. The method also includes reducing a graphics processor clock rate if the percentage of idle time is higher than a high limit threshold; and increasing the graphics processor clock rate if the percentage of idle time is lower than a low limit threshold.

BRIEF DESCRIPTION OF THE DRAWINGS

Embodiments of the present invention will be better understood from the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or "calculating" or "reducing" or "increasing" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Graphics Processor Clock Scaling Based on Idle Time

Embodiments of this present invention provide solutions to the increasing challenges inherent in conserving power in computer systems, particularly in mobile computer systems where efficient use of limited battery life is required. Various embodiments of the present disclosure provide dynamic scaling of a clock signal for a graphics processor (GPU) based upon the percentage of idle time experienced by the graphics processor. As discussed herein, if an idle time percentage is higher than a high limit or threshold, a GPU clock rate may be reduced. If the idle time percentage is below a low limit or threshold, the GPU clock rate may be increased. As also discussed herein, the low limit and high limit may also be dynamically adjusted as well, based upon an evaluation of a proportion of scale down decisions versus scale up decisions. As described herein, individual scale down decisions decrease the GPU clock rate while individual scale up decisions increase the GPU clock rate.

Figure 1:
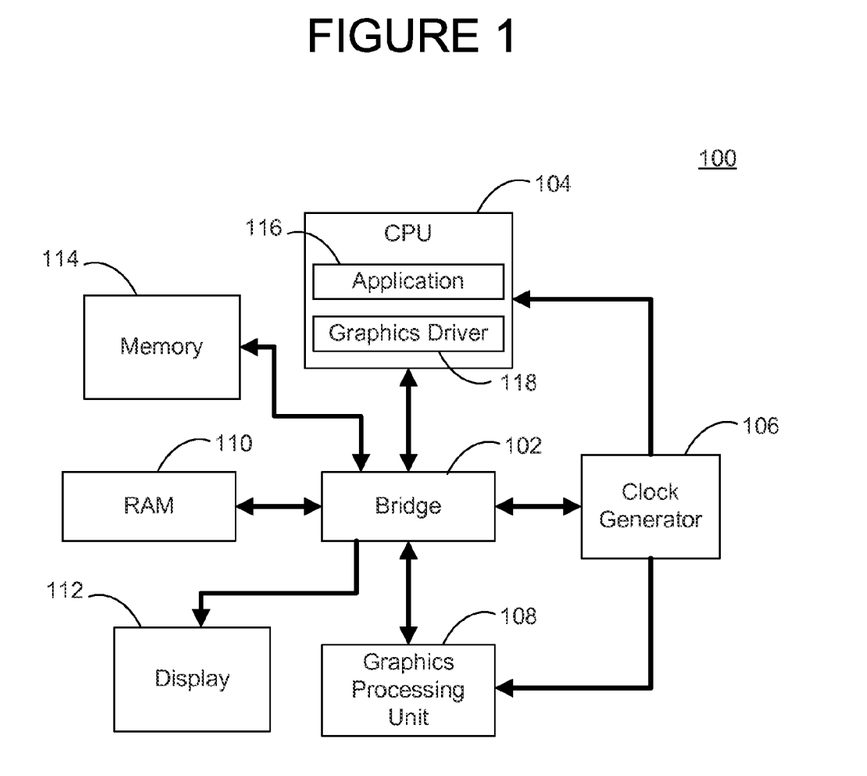
FIG. 1 illustrates an exemplary simplified schematic diagram of a computer system with a dynamically adjustable clock generator in accordance with an embodiment of the present invention.

FIG. 1 illustrates an exemplary simplified schematic diagram of a computer system with a dynamically adjustable clock generator in accordance with an embodiment of the present invention. The computer system of FIG. 1 comprises a bridge 102 linking together a processor (CPU) 104, a clock generator 106, a graphics processing unit (GPU) 108, a RAM memory 110, a display device 112, and a memory 114. In one embodiment, the bridge 102 comprises an interface for communicating display information from the GPU 108 to the display device 112. In one embodiment, the interface comprises an embedded DisplayPort (eDP) interface or a low-voltage differential signaling (LVDS) interface.

In one exemplary embodiment, the CPU 104 executes an application 116 that is in communication with a graphics driver 118 operable to direct the GPU 108. In one exemplary embodiment, the memory 114 may comprise a hard drive or other memory storage device. In one embodiment, the clock generator 106 generates clocks for the GPU 108 and the CPU 104. It is appreciated that in one exemplary embodiment, the clock generator 106 dynamically adjusts the GPU clock rate based upon a percentage of idle time.

Figure 2A:
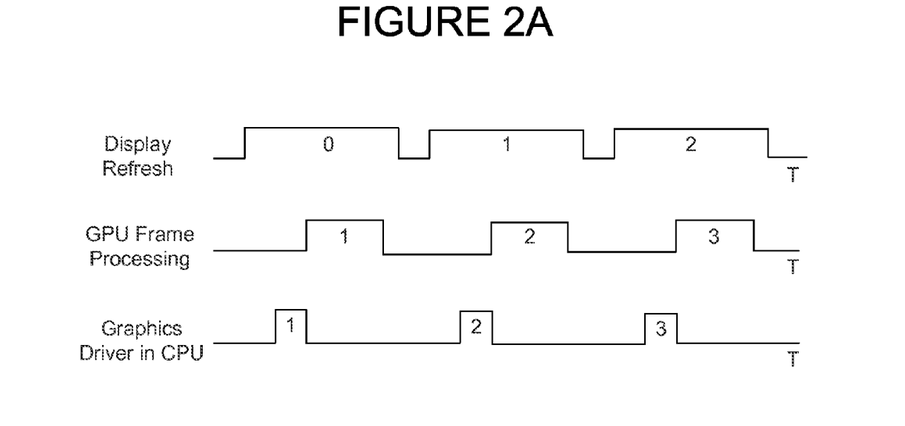
FIG. 2A illustrates an exemplary timing diagram of the timing relationships between a display refresh cycle, a graphics processor cycle, and a graphics driver cycle in a CPU in accordance with an embodiment of the present invention.

FIG. 2A illustrates a timing diagram of exemplary timing relationships between a display refresh cycle, a graphics processor cycle, and a graphics driver cycle in a CPU 104 in accordance with an embodiment of the present invention. In one exemplary embodiment, a display 112 refreshes according to the timing diagram illustrated in FIG. 2A. As illustrated in FIG. 2A, a display device 112 is periodically refreshed, such as during a time period 0, where a new frame 0 is displayed, a time period 1, where a new frame 1 is displayed, and a time period 2, where a new frame 2 is displayed. In an exemplary embodiment where the GPU 108 refreshes the display 112 at a 60 Hz rate, a new frame of data will be displayed approximately every 16.7 milliseconds.

As illustrated in FIG. 2A, while the display 112 is being refreshed with a current frame of display data, the next frame of data to be displayed is also being processed by the GPU 108. For example, while the display 112 is being refreshed with frame 0, the GPU is also processing data for the next frame, frame 1. As also illustrated in FIG. 2A, before the GPU 108 begins processing the data for the next frame, the graphics driver in the CPU 104 will have completed is its processing and directed the GPU 108 to proceed with processing the data. During a time period where the display is being refreshed with a frame of data (e.g., frame 0), the graphics driver in the CPU 104 communicates command(s) to the GPU 108 to process a next frame of data (e.g., frame 1) that will be used to refresh the display during a next time period. In other words, while the display 112 is refreshed with a current frame of data, a next frame of data is processed by the graphics driver 118 and the GPU 108.

As illustrated in FIG. 2A, in one exemplary embodiment, a length of time required for the graphics driver 118 and the GPU 108 to process a frame of display data for refreshing the display 112 is less than an amount of time required to refresh the display 112 with the frame of data. Therefore, as described herein, a length of time utilized by the GPU 108 to process a frame of display data may be adjusted to increase or decrease a ratio of active time to idle time in the GPU 108. Such adjustments may allow the GPU 108 to be operated with optimal energy efficiency.

Figure 2B:
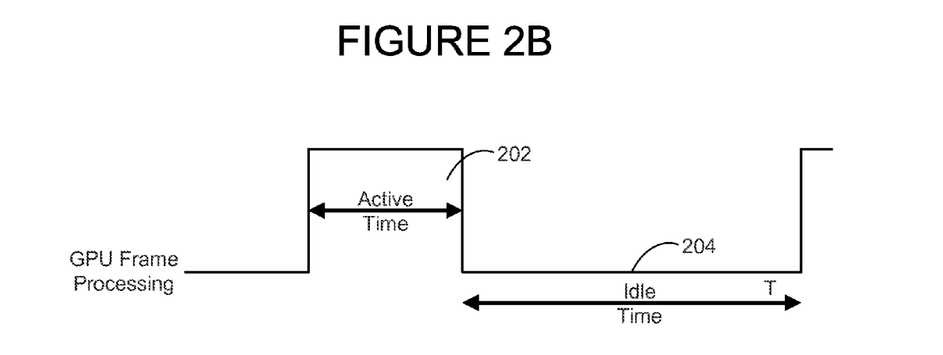
FIG. 2B illustrates an exemplary timing diagram illustrating a relationship between an active time and an idle time for a graphics processor in accordance with an embodiment of the present invention.

FIG. 2B illustrates a timing diagram illustrating an exemplary relationship between an active time and an idle time of a graphics processor 108 in accordance with an embodiment of the present invention. As illustrated in FIG. 2B, a graphics processor 108 will have: a period of active time 202 when the graphics processor 108 is actively processing a frame of display data, and a period of idle time 204 when the graphics processor 108 is idle and waiting for further instructions and data to process. As discussed herein, a percentage of idle time 204 as compared to active time 202 may be used to dynamically adjust the GPU clock rate.

A ratio of idle time 204 to active time 202 may be adjusted so as to improve energy efficiency by adjusting a clock rate for the graphics processor 108. As described herein, when a ratio of idle time 204 to active time 202 is above or below threshold values, the clock rate for the graphics processor 108 may be lowered or increased to decrease the idle time 204 and increase active time 202, or in the alternative, increase the idle time 204 and decrease the active time 202, to optimally adjust the ratio of idle time 204 to active time 202. In one embodiment, a graphics processor clock rate may be increased in proportion to an amount that a percentage of idle time is lower than a low limit threshold. In one embodiment, a graphics processor clock rate may be decreased in proportion to an amount that a percentage of idle time is higher than a high limit threshold. In further embodiments, the graphics processor clock rate may be increased or decreased a predetermined amount. In one embodiment, a high limit threshold is greater than 50% and a low limit threshold is less than 50%.

Figure 3:
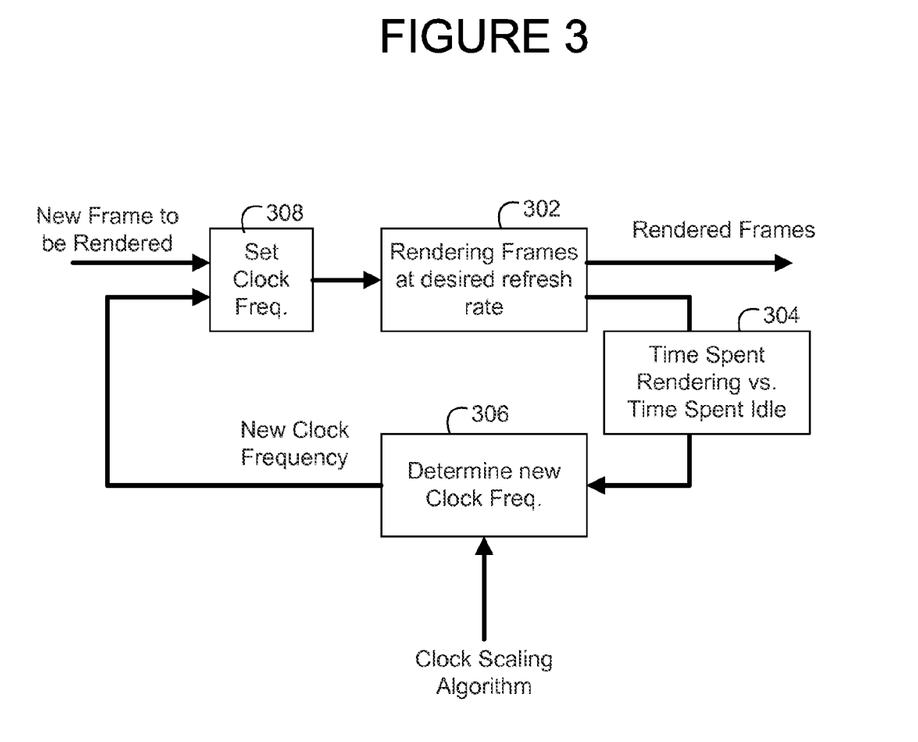
FIG. 3 illustrates an exemplary simplified schematic flow diagram of a process for dynamically adjusted clock scaling for a graphics processor in accordance with an embodiment of the present invention.

FIG. 3 illustrates an exemplary simplified flow diagram illustrating an operation of an exemplary dynamic graphics processor with dynamically adjusted clock scaling in accordance with an embodiment of the present invention. As illustrated in block 302 of FIG. 3, frames of display data are rendered by the GPU 108 at a desired clock rate. When frames of display data are rendered, the rendered frames may be passed on to the display device 112, and in block 304 of FIG. 3, a measurement of the time spent rendering the frame of display data (active time 202) is measured and compared to an amount of time spent idle (idle time 204). In block 306 of FIG. 3, a clock scaling algorithm is used to set a high threshold value and a low threshold value.

In block 306 of FIG. 3, the GPU clock rate may be reduced when the percentage of idle time is above the high threshold value, and increased when the percentage of idle time is below the low threshold value. As illustrated in FIG. 3, when a new frame of display data is received by the GPU 108 for rendering, the GPU 108 will process the data at the clock rate set in block 308 of FIG. 3 (which was determined in block 306 of FIG. 3). Such exemplary adjustments may allow the GPU 108 to improve power efficiency without hindering performance. As also discussed herein, an exemplary clock scaling algorithm may be used to dynamically adjust the high threshold value and the low threshold value based upon a proportion of clock rate increases versus clock rate decreases. Furthermore, as discussed herein, evaluation periods may also be adjusted.

In one exemplary embodiment, a proportion of clock rate increases (e.g., individual decisions to increase the clock rate) versus clock rate decreases (e.g., individual decisions to decrease the clock rate) may be determined using idle hints and busy hints. Exemplary idle hints and busy hints are described in detail below. As discussed herein, the proportion of clock rate increases to clock rate decreases may be used to determine a desired percentage of idle time, and to scale the GPU clock rate, respectively. Thus, power consumption may be reduced without hindering performance.

In one exemplary embodiment, when the graphics processor 108 becomes idle, an "idle hint" is generated. As discussed herein, idle hints produce an elapsed idle time that is added to an accumulated idle time. A time stamp recording the beginning of the idle time is recorded and a delayed call back is scheduled to deliver an additional idle hint. If there have been no busy hints since the last idle hint, the elapsed time since the last idle hint is added to the accumulated idle time. When work is submitted to the graphics processor 108, a busy hint is generated. Any pending idle hints are canceled, and if the graphics processor 108 was previously idle, the elapsed time is added to the accumulated idle time. Time stamps and the accumulated idle time may be cleared periodically. To minimize possible performance impacts, two evaluation periods may be used: a short evaluation period during which busy hints are detected, and a long evaluation period during which scale-down decisions are made. As discussed herein, lengths of evaluation periods may also be adjusted.

Figure 4:
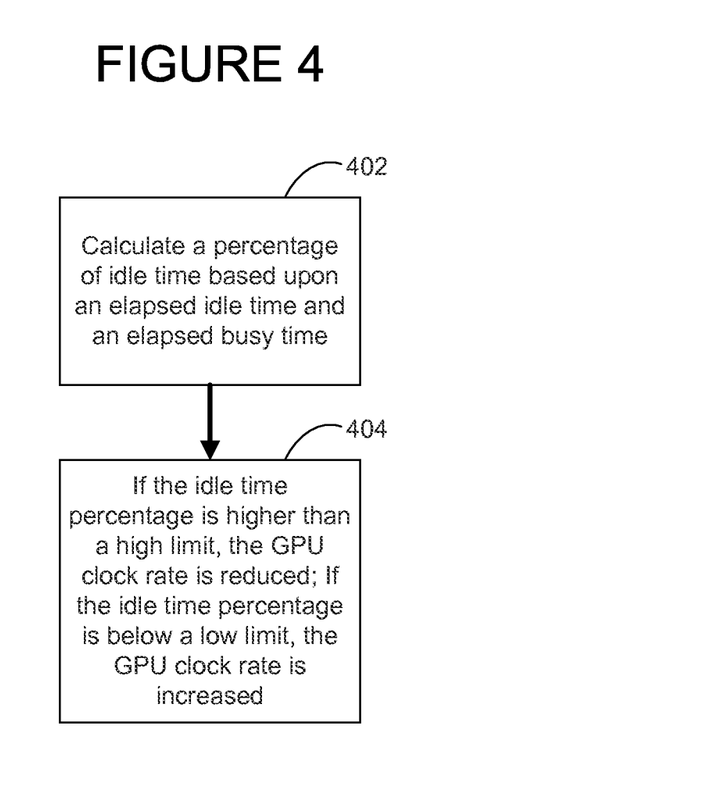
FIG. 4 illustrates an exemplary flow diagram, illustrating the steps to a method for dynamically scaling a clock rate for a graphics processor in accordance with an embodiment of the present invention.

As illustrated in the flow diagram of FIG. 4, a percentage of idle time is calculated based upon accumulated busy hints and idle hints and their corresponding accumulated idle times and active times. If an idle time percentage is higher than a high threshold value, the GPU clock rate may be reduced (reducing the GPU clock rate will slow the processing of display data, increasing the amount of accumulated active time). If an idle time percentage is below a low threshold value, the GPU clock rate may be increased (increasing the GPU clock rate will speed the processing of display data, decreasing the amount of accumulated active time). In step 402 of FIG. 4, a percentage of idle time is calculated. The percentage of idle time is based upon an accumulated quantity of idle time and an accumulated quantity of active time. In step 404 of FIG. 4, if the idle time percentage is higher than a high threshold value, the GPU clock rate will be reduced, and if the idle time percentage is below a low threshold value, the GPU clock rate will be increased.

The values chosen for idle time percentage limits (e.g., high threshold values and low threshold values) and evaluation periods may have a significant impact on performance. In one exemplary embodiment, a range of high and low threshold values may be selected. A range of threshold values may be used to save power while preserving performance on a wide range of applications and operating conditions. The following describes a dynamic method for setting adjustable idle time percentage high and low threshold values, as well as the evaluation periods, and does not limit the scope of the claims.

Figure 5:
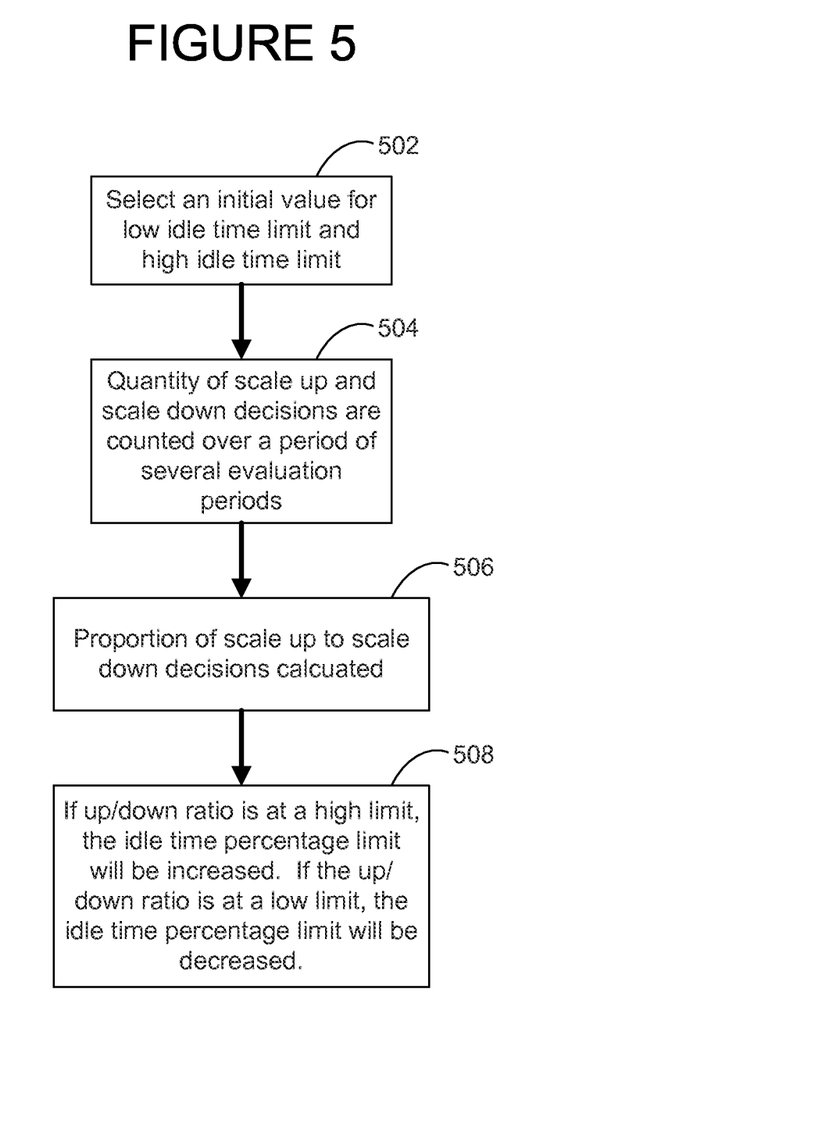
FIG. 5 illustrates an exemplary flow diagram, illustrating the steps to a method for dynamically adjusting the high/low limits for an algorithm for dynamically scaling a clock rate for a graphics processor in accordance with an embodiment of the present invention.

FIG. 5 illustrates an exemplary flow diagram, illustrating a method for dynamically adjusting idle time percentage high threshold values and low threshold values to dynamically scale a clock rate for a graphics processor 108 in accordance with an embodiment of the present invention. In step 502 of FIG. 5, initial values may be selected for an idle time percentage high threshold value and an idle time percentage low threshold value. In one embodiment, during step 502 of FIG. 2, an initial evaluation period length is also selected.

In step 504 of FIG. 5, a quantity of scale-up decisions and a quantity of scale-down decisions are counted over a period that is longer than a quantity of scale-down evaluation periods. In one embodiment, a period for counting scale-up decisions and scale-down decisions is significantly longer than an individual scale-down evaluation period (by a factor of approximately 10). In other words, while scale-down evaluation periods are longer than scale-up evaluation periods, the evaluation period of step 504 is approximately 10 times longer than a single scale-down evaluation period; therefore, the evaluation period of step 504 of FIG. 5 comprises a plurality of scale-up evaluation periods and a plurality of scale-down evaluation periods. In step 506 of FIG. 5, a proportion of scale-up decisions to scale-down decisions is calculated, and the calculated proportion used to tighten or relax the evaluation periods and percentage parameters (e.g., idle time percentage high threshold values, idle time percentage low threshold values, scale-down evaluation periods, and scale-up evaluation periods) accordingly.

In step 508 of FIG. 5, if a scale-up/scale-down ratio is at a high limit, idle time percentage threshold values may be increased. In the alternative, if the scale-up/scale-down ratio is at a low limit, idle time percentage threshold values may be decreased. In one embodiment, if the scale-up/scale-down ratio is at a high limit (e.g., 4:1) or higher, the idle time percentage threshold values may be increased (e.g., the idle time percentage high threshold value and the idle time percentage low threshold value may be increased by up to 50%), making scale down decisions less likely. In one embodiment, if the scale-up/scale-down ratio is at a low limit (e.g., 1:1) or lower, the idle time percentage threshold values may be decreased (e.g., the idle time percentage high threshold value and the idle time percentage low threshold value may be decreased by up to 50%), making scale down decisions more likely. Ratios in-between (e.g., between 1:1 and 4:1) produce linearly proportional limit changes such that the values chosen at the end of the range (4:1-1:1) are as described.

In one embodiment, evaluation period lengths may also be adjusted similarly. A shorter or longer evaluation period may be used for determining scale-up decisions and scale-down decisions (e.g., shorter or longer evaluation periods may be used for counting scale-up decisions and scale-down decisions before a scale-up/scale-down ratio is determined). In one embodiment, the scale-up decision counting period may be adjusted by up to 50%, and the scale-down decision counting period may be adjusted by up to 25%.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for graphics processor clock scaling, the method comprising:
    calculating a percentage of idle-time based upon an accumulated idle-time of the graphics processor and an accumulated active time of the graphics processor;
    reducing a graphics processor clock rate if the percentage of idle time is higher than a high limit threshold; and
    increasing the graphics processor clock rate if the percentage of idle time is lower than a low limit threshold, wherein the low limit threshold and the high limit threshold are each adjusted based upon a proportion of graphics processor clock rate increases to graphics processor clock rate decreases.

2. The method of claim 1, wherein the increasing comprises increasing the graphics processor clock rate a predetermined amount if the percentage of idle time is lower than a low limit threshold, and wherein the reducing comprises decreasing the graphics processor clock rate a predetermined amount if the percentage of idle time is higher than a high limit threshold.

3. The method of claim 1 further comprising:
    increasing the high limit threshold and the low limit threshold when the proportion of graphics processor clock rate increases to graphics processor clock rate decreases is at a high limit; and
    decreasing the high limit threshold and the low limit threshold when the proportion of graphics processor clock rate increases to graphics processor clock rate decreases is at a low limit.

4. The method of claim 3, wherein the proportion high limit is 4:1 and the proportion low limit is 1:1.

5. The method of claim 1, wherein the high limit threshold is greater than 50%.

6. The method of claim 1, wherein the low limit threshold is less than 50%.

7. A method for graphics processor clock scaling, the method comprising:
    counting a quantity of clock scale-up decisions and a quantity of clock scale-down decisions over a first evaluation period of a plurality of scale-up evaluation periods and a plurality of scale-down evaluation periods;
    based upon the clock scale-up decisions and the clock scale-down decisions, increasing and decreasing a graphic processor clock rate, respectively, when a percentage of idle time in a scale-up evaluation period is lower than a selected idle-time percentage low-limit value and when a percentage of idle time in a scale-down evaluation period is higher than a selected idle-time percentage high-limit value, respectively;
    calculating a proportion of clock scale-up decisions to clock scale-down decisions; and
    increasing the idle-time percentage high-limit value and the idle-time percentage low-limit value if the proportion of clock scale-up decisions to clock scale-down decisions is at a high limit and decreasing the idle-time percentage high-limit value and the idle-time percentage low-limit value if the proportion of clock scale-up decisions to clock scale-down decisions is at a low limit.

8. The method of claim 7 further comprising:
    increasing the graphics processor clock rate a predetermined amount if the percentage of idle time is lower than the selected idle-time percentage low-limit value; and
    decreasing the graphics processor clock rate a predetermined amount if the percentage of idle time is higher than the selected idle-time percentage high-limit value.

9. The method of claim 7, wherein the selected idle-time percentage high-limit value is greater than 50%, and wherein the selected idle-time percentage low-limit value is less than 50%.

10. The method of claim 7, wherein the proportion high limit is 4:1 and the proportion low limit is 1:1.

11. The method of claim 7, wherein increasing the idle-time percentage high-limit value and increasing the idle-time percentage low-limit value increases the idle-time percentage high-limit value and the idle-time percentage low-limit value by a maximum of 50%.

12. The method of claim 7, wherein decreasing the idle-time percentage high-limit value and decreasing the idle-time percentage low-limit value decreases the idle-time percentage high-limit value and the idle-time percentage low-limit value by a maximum of 50%.

13. A computer system comprising:
a processor;
a graphics processor;
a memory; and
a clock generator, wherein the clock generator is operable to generate clock signals for the processor and the graphics processor, wherein the memory is operable to store instructions, that when executed by the processor perform a method of scaling a clock output of the clock generator to the graphics processor, the method comprising:
calculating a percentage of idle-time based upon an accumulated idle-time and an accumulated active time;
reducing a graphics processor clock rate if the percentage of idle time is higher than a high limit threshold;
increasing the graphics processor clock rate if the percentage of idle time is lower than a low limit threshold; and
adjusting the low limit threshold and the high limit threshold based upon a proportion of graphics processor clock rate increases to graphics processor clock rate decreases.

14. The computer system of claim 13, wherein the method further comprises:
increasing the graphics processor clock rate a predetermined amount if the percentage of idle time is lower than a low limit threshold; and
decreasing the graphics processor clock rate a predetermined amount if the percentage of idle time is higher than a high limit threshold.

15. The computer system of claim 13, wherein the high limit threshold and the low limit threshold are increased when the proportion of graphics processor clock rate increases to graphics processor clock rate decreases is at a high limit, and wherein the high limit threshold and the low limit threshold are decreased when the proportion of graphics processor clock rate increases to graphics processor clock rate decreases is at a low limit.

16. The computer system of claim 15, wherein the proportion high limit is 4:1 and the proportion low limit is 1:1.

17. The computer system of claim 13, wherein the high limit threshold is greater than 50%.

18. The computer system of claim 13, wherein the low limit threshold is less than 50%.

* * * * *